United States Patent
Maeda

(10) Patent No.: US 11,922,545 B2
(45) Date of Patent: Mar. 5, 2024

(54) RECORDING MEDIUM RECORDING INPUT PROGRAM, INPUT DEVICE, AND INPUT METHOD

(71) Applicant: CASIO COMPUTER CO., LTD., Tokyo (JP)

(72) Inventor: Naoya Maeda, Tachikawa (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 89 days.

(21) Appl. No.: 17/466,032

(22) Filed: Sep. 3, 2021

(65) Prior Publication Data
US 2022/0092832 A1 Mar. 24, 2022

(30) Foreign Application Priority Data
Sep. 24, 2020 (JP) ................. 2020-159419

(51) Int. Cl.
| | |
|---|---|
| *G06T 11/20* | (2006.01) |
| *G06F 3/0482* | (2013.01) |
| *G06F 3/0486* | (2013.01) |
| *G06F 3/0487* | (2013.01) |

(52) U.S. Cl.
CPC .......... *G06T 11/206* (2013.01); *G06F 3/0482* (2013.01); *G06F 3/0486* (2013.01); *G06F 3/0487* (2013.01); *G06T 2200/24* (2013.01)

(58) Field of Classification Search
CPC ... G06T 11/206; G06T 2200/24; G06T 11/60; G06F 3/0482; G06F 3/0486; G06F 3/0487; G06F 3/04883; G06F 15/0225; G06F 40/111; G06F 40/18; G06F 3/04886
See application file for complete search history.

(56) References Cited

U.S. PATENT DOCUMENTS

| | | | |
|---|---|---|---|
| 9,767,069 B2 | 9/2017 | Karoji | |
| 10,902,012 B1* | 1/2021 | Breslau | G06F 16/86 |
| 2010/0245261 A1* | 9/2010 | Karlsson | G06F 3/0233 |
| | | | 345/173 |
| 2012/0189203 A1* | 7/2012 | Lin | G06F 40/18 |
| | | | 382/181 |
| 2015/0081750 A1* | 3/2015 | Karoji | G06F 15/02 |
| | | | 708/130 |

(Continued)

FOREIGN PATENT DOCUMENTS

| | | |
|---|---|---|
| JP | 2012522284 A | 9/2012 |
| JP | 2014510963 A | 5/2014 |
| JP | 2015-060459 A | 3/2015 |

OTHER PUBLICATIONS

StackOverflow ("Store Math Formula in Variable", Stack Overflow, published on Sep. 14, 2015 at https://stackoverflow.com/questions/32571349/store-math-formula-in-variable (Year: 2015).*

(Continued)

*Primary Examiner* — William A Beutel
(74) *Attorney, Agent, or Firm* — SCULLY SCOTT MURPHY & PRESSER, PC

(57) ABSTRACT

A non-transitory computer-readable recording medium records an input program for causing a computer to execute selecting contents displayed on a display screen of a display, and inputting the selected contents to an input area on the display screen upon receiving an execution instruction while the selected contents are selected.

14 Claims, 12 Drawing Sheets

(56) References Cited

U.S. PATENT DOCUMENTS

| | | | | |
|---|---|---|---|---|
| 2015/0186351 A1* | 7/2015 | Hicks | ............... | G06F 3/0482 |
| | | | | 715/232 |
| 2015/0206447 A1* | 7/2015 | Vahid | ............... | G09B 5/08 |
| | | | | 434/362 |
| 2017/0322918 A1* | 11/2017 | Watanabe | ............... | G06F 3/0482 |
| 2018/0067640 A1* | 3/2018 | Jiang | ............... | G06F 17/10 |
| 2020/0257852 A1* | 8/2020 | Canton | ............... | G06F 40/151 |

OTHER PUBLICATIONS

ExtendOffice ("How to convert column list to comma separated list in Excel", published at https://www.extendoffice.com/documents/excel/1544-excel-convert-column-to-comma-separated-list.html#:~:text=Select%20a%20blank%20cell%20adjacent,want%20to%20separate%20the%20list). as of Jul. 29, 2014 (Year: 2014).*

Dharmadasa, Kasun, "Java Lambda Expressions", https://medium.com/@kasunpdh/java-lambda-expressions-3195f677ed38, Dec. 29, 2018 (Year: 2018).*

Desmos, desmos User Guide, translated by Yoshito Horikawa [online], [retrieved on Sep. 11, 2020], Internet<URL:https://desmos.s3.amazonaws.com/Desmos_User_Guide_JA.pdf>.

"Mathematica Memorized in Kosaku Nagasaka and Half a Day", Dec. 22, 2014—Retrieved on Oct. 11, 2022 from https://web.archive.org/web/20141222103011/https://wwwmain.h.kobe-u.ac.jp/~nagasaka/mma/LearningMathematica.pdf.

"Linear Algebra with Mathematica", Aug. 3, 2016—Retrieved on Oct. 11, 2022 from https://web.archive.org/web/20160803122045/]//ocw.nagoya-u.jp/files/71/Ma-senkei.pdf.

Notice of Reasons for Refusal dated Oct. 18, 2022 received in Japanese Patent Application No. JP 2020-159419.

* cited by examiner

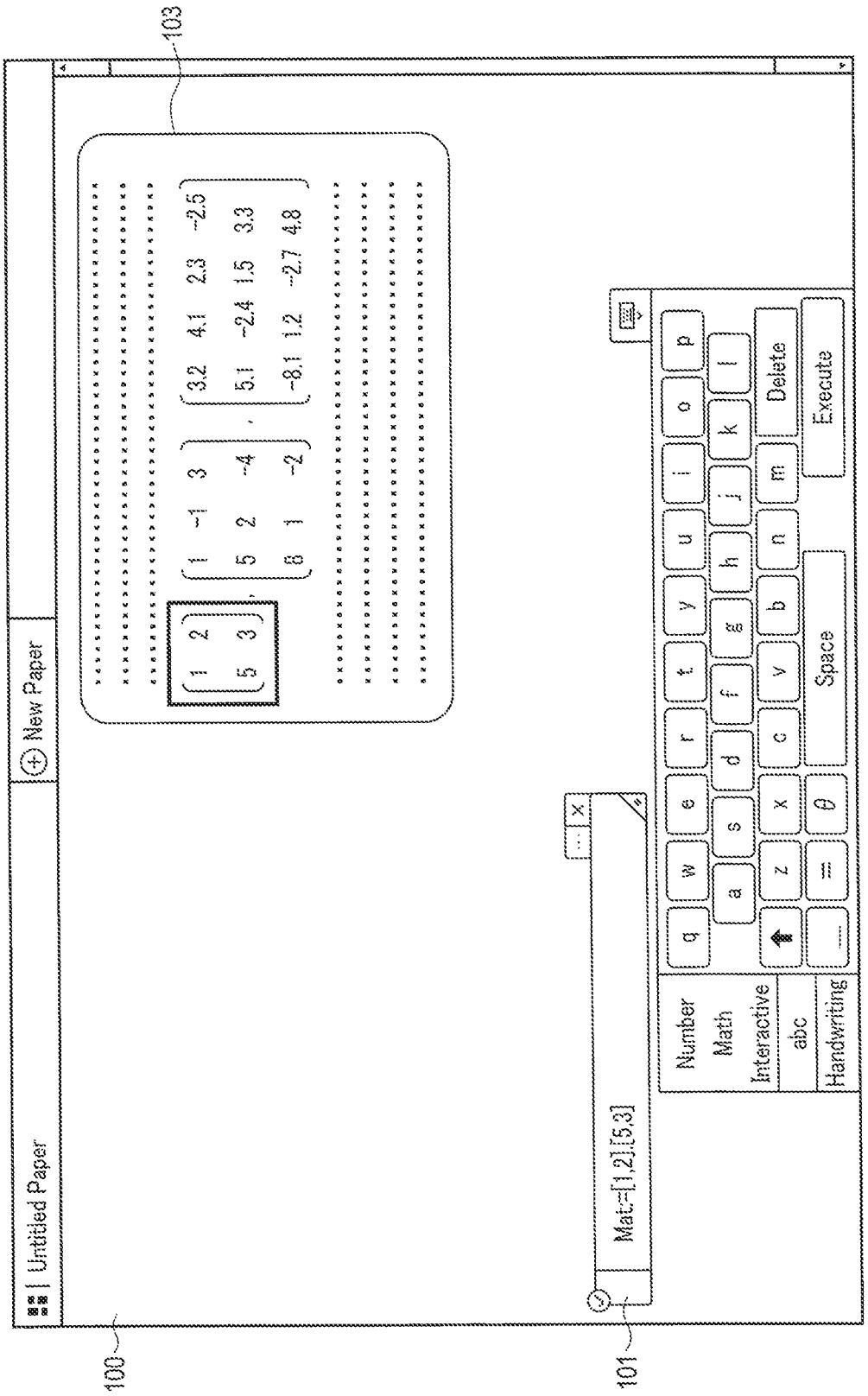

RECORDING MEDIUM RECORDING INPUT PROGRAM, INPUT DEVICE, AND INPUT METHOD

CROSS-REFERENCE TO RELATED APPLICATIONS

This application is based upon and claims the benefit of priority from the Japanese Patent Application No. 2020-159419, filed Sep. 24, 2020, the entire contents of which are incorporated herein by reference.

FIELD

The present disclosure relates to a recording medium recording an input program, an input device, and an input method.

BACKGROUND

There is known a graph drawing application that can be used on a web browser. For example, some application is configured to perform a computation based on mathematical expressions input to a formula list by a user and draw a graph on the web browser based on the computation result.

SUMMARY

The application is required to use a convenient input scheme. The present disclosure has an object to provide a convenient input scheme.

According to a first aspect, a non-transitory computer-readable recording medium records an input program for causing a computer to execute selecting contents displayed on a display screen of a display, and inputting the selected contents to an input area on the display screen upon receiving an execution instruction while the selected contents are selected.

According to a second aspect, an input device comprising an input interface configured to select contents displayed on a display screen of a display and a processor. The processor is configured to input the selected contents to an input area on the display screen upon receiving an execution instruction while the selected contents are selected.

According to a third aspect, an input method comprising selecting contents displayed on a display screen of a display and inputting the selected contents to an input area on the display screen upon receiving an execution instruction while the selected contents are selected.

BRIEF DESCRIPTION OF THE DRAWINGS

FIG. 12 is a view for explaining a fourth creating operation for a calculation sticky note from a reference sticky note.

DETAILED DESCRIPTION

Figure 1:
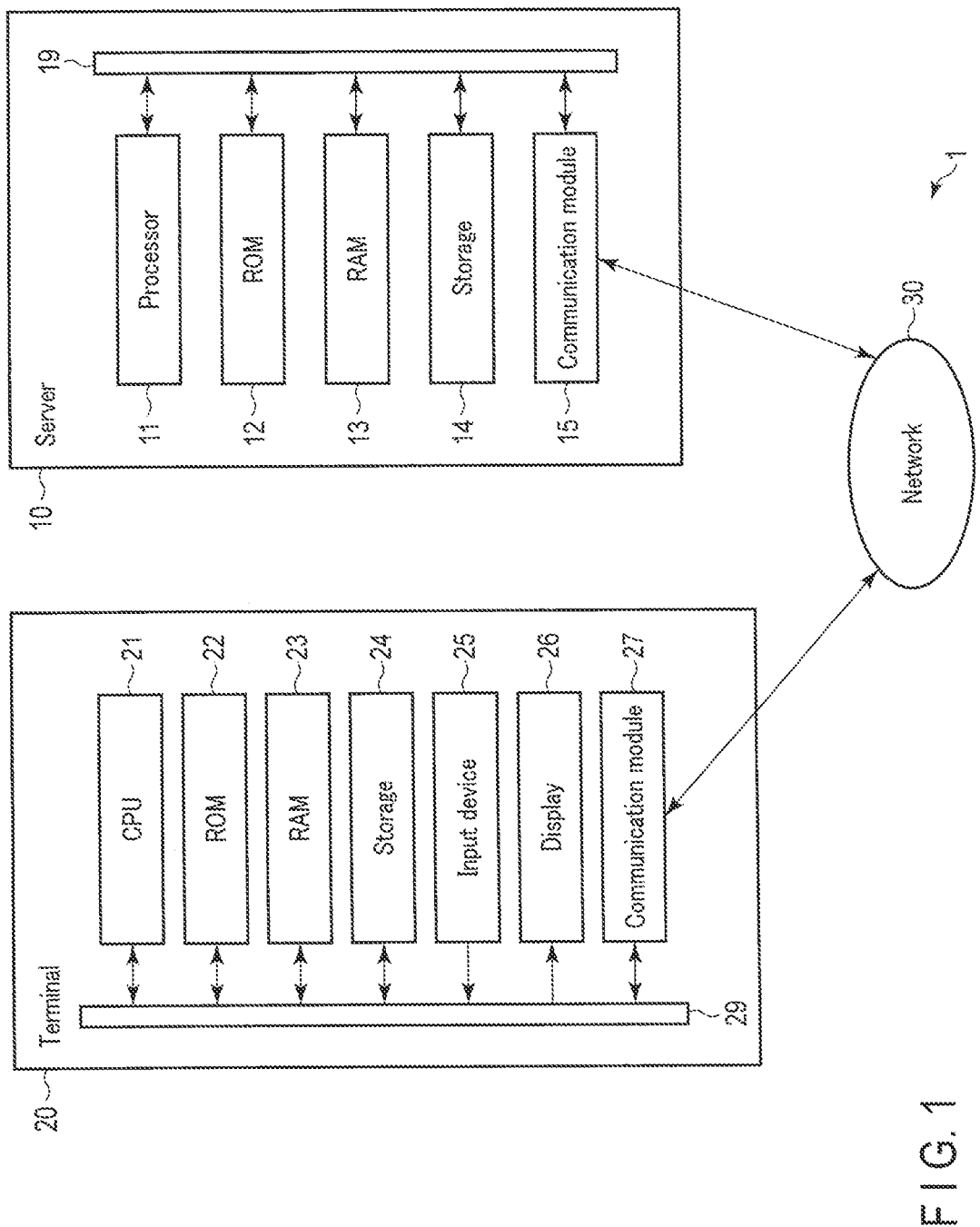
FIG. 1 is a block diagram showing an example of the arrangement of a system according to an embodiment of this disclosure.

An embodiment of this disclosure will be described with reference to the accompanying drawings. FIG. 1 shows an example of the arrangement of a system 1 according to an embodiment of the disclosure. The system 1 includes a server 10 and a terminal 20. The server 10 is communicably connected to the terminal 20 via a network 30. The network 30 is, for example, the internet. Although FIG. 1 shows only the single terminal 20, the number of terminals 20 is not limited to one. That is, the system 1 may include two or more terminals 20.

The server 10 includes a processor 11, a ROM 12, a RAM 13, a storage 14, and a communication module 15. These components are connected to each other via a system bus 19.

The processor 11 may be an integrated circuit including a CPU (Central Processing Unit). The ROM 12 records information used for the operation of the processor 11 and the like. The RAM 13 is a main memory for the operation of the processor 11 and the like. The storage 14 stores server control programs used by the processor 11 and various types of programs such as computation programs for the execution of various types of computations, parameters, and the like. The processor 11 controls the operation of the server 10 in accordance with programs stored in the storage 14. As the processor 11, a processor other than a CPU may be used, such as an ASIC (Application Specific Integrated Circuit), FPGA (Field Programmable Gate Array), and GPU (Graphic Processing Unit). The communication module 15 includes a circuit for communicating with an external communication network such as the network 30.

A terminal 20 includes a CPU 21, a ROM 22, a RAM 23, a storage 24, an input device 25, a display 26, and a communication module 27. These components are connected to each other via a system bus 29. The terminal 20 may be an electronic device such as a personal computer (PC), tablet terminal, or smartphone. The terminal 20 may be, for example, a scientific calculator having a communication function.

The CPU 21 is a processor that controls various operations of the terminal 20. The ROM 22 records a boot program and the like for the terminal 20. The RAM 23 is a main memory for the CPU 21 and the like. The storage 24 stores various types of programs such as terminal control programs used by the CPU 21, parameters, and the like. The CPU 21 controls the operation of the terminal 20 by executing various types of programs in accordance with input signals from the input device 25 and reception signals via the communication module 27. Various types of programs may be download from a web server (not shown) to the storage 24 via a network 30 and the communication module 27. The communication module 27 includes a circuit for communicating with an external communication network such as the network 30.

The input device 25 is an input interface including a keyboard, a mouse, and a touch panel. In accordance with a user operation via the input device 25, the CPU 21 receives a signal indicating the contents of the user operation via the system bus 29.

The display 26 is a liquid crystal display, organic EL display, or the like. The display 26 may be integrally provided in the terminal 20 or provided separately from the terminal 20. The display 26 displays various types of images.

For example, the user designates the address of the server 10 on the web browser operating on the terminal 20. At this time, a display screen for the web application stored in the server 10 is displayed on the web browser of the terminal 20. A request is issued to the server 10 in accordance with an operation on this display screen via the input device 25. This operation includes, for example, an input operation for a numerical value or mathematical expression on the display screen. The server 10 executes processing corresponding to the request and returns the processing result as a response to the terminal 20. The terminal 20 displays a calculation result on a mathematical expression in accordance with the response from the server 10 or displays a graph drawn in accordance with a mathematical expression. In this manner, the system 1 implements a function as a web application for graph drawing or the like by using a program operating on the web browser of the terminal 20 and a computation program in the server 10.

Such a web application is utilized for a math class or the like in the field of school education with a growing trend toward ICT (Information and Communication Technology).

Figure 2:
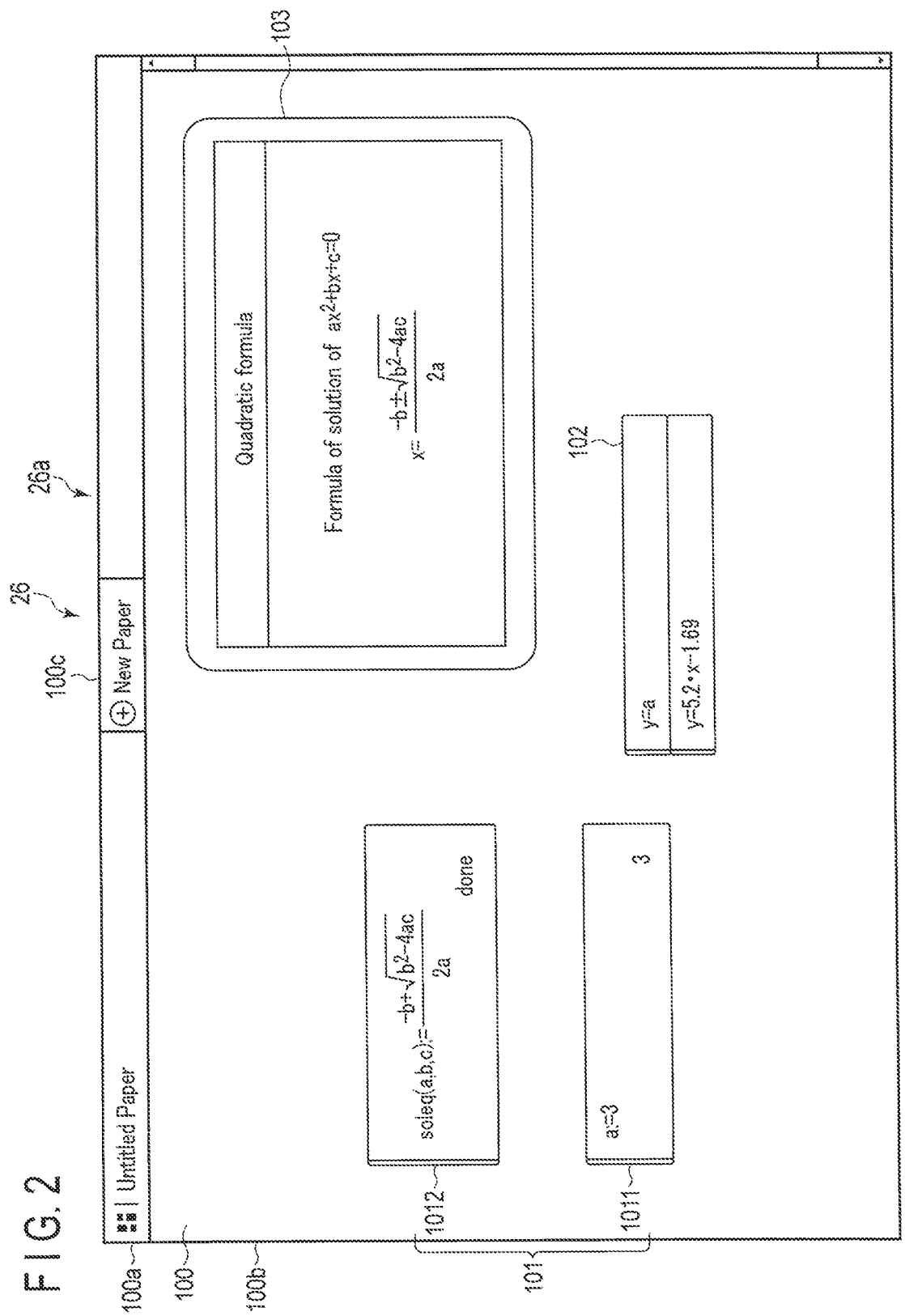
FIG. 2 is a view showing an example of screen display by an application operating on the web browser of a terminal.

FIG. 2 shows an example of screen display by an application operating on the web browser of the terminal 20.

A screen 26a displayed on the display 26 of the terminal 20 includes an upper area 100a and a lower area 100b. The upper area 100a is displayed on the upper side of the screen 26a. The upper area 100a is narrower than the lower area 100b. A new paper creation icon 100c is displayed in the upper area 100a. The lower area 100b is an area arranged on the lower side of the screen 26a relative to the upper area 100a. In the following description, the lower area 100b will also be referred to as a paper 100. Various types of "sticky notes" can be displayed on the paper 100. A sticky note is a small display area for displaying various types of information associated with web applications. A sticky note can be an input area that receives various types of inputs from the user. A sticky note may be a floating object. The floating object is an object (display object) displayed on a screen. At least the display position of the object can be changed in accordance with a user operation.

In the example shown in FIG. 2, a calculation sticky note 101, a graph function sticky note 102, and a reference sticky note 103 are displayed on the paper 100. Sticky notes may include those other than the calculation sticky note 101, the graph function sticky note 102, and the reference sticky note 103.

The calculation sticky note 101 is a sticky note including a display area for displaying a numerical value or mathematical expression input in response to the reception of a user operation. Referring to FIG. 2, two calculation sticky notes 1011 and 1012 are displayed. For example, when the user selects an arbitrary position of the paper 100, a sticky note creation menu (not shown) is displayed. When the user selects "calculation sticky note creation" from the sticky note creation menu, the calculation sticky note 101 and a software keyboard are displayed in the paper 100. The user can input a desired numerical value or mathematical expression into the calculation sticky note 101 by selecting corresponding keys of the software keyboard. The numerical value or mathematical expression input to the calculation sticky note 101 has numerical value information by itself. The input numerical value or mathematical expression information input to the calculation sticky note 101 is sent to the server 10.

In this case, when the mathematical expression input to the calculation sticky note 101 is an expression that can be singly numerically calculated, the server 10 returns the calculation result on the mathematical expression to the terminal 20. This calculation result is displayed at, for example, the lower right corner of the calculation sticky note 101. For example, "a=3" is input to the calculation sticky note 1011. In this case, "3" as the calculation result is displayed at the lower right corner of the calculation sticky note 1011. In contrast to this, if the mathematical expression input to the calculation sticky note 101 is an expression that cannot be singly calculated, such as a literal expression or function and no necessary argument value is determined, the server 10 returns, to the terminal 20, information indicating that the expression cannot be calculated. For example, a quadratic formula is input to the calculation sticky note 1012. In this case, numerical calculation cannot be performed unless "a", "b", and "c" are determined. In this case, the mathematical expression is handled as a function, and no calculation result is displayed at the lower right corner of the calculation sticky note 1012. Referring to FIG. 2, the character string "done" is displayed at the lower right corner of the calculation sticky note 1012 instead of a calculation result. Note that "a", "b", and "c" input to the calculation sticky note 1012 are handled as arguments of the function. For example, referring to FIG. 2, "a=3" is input to the calculation sticky note 1011. In this case, "a" on the calculation sticky note 1012 is handled as "3". When all the values of "a", "b", and "c" are determined, the server 10 returns a calculation result on the mathematical expression input to the calculation sticky note 1012. In this case, the calculation result is displayed at the lower right corner of the calculation sticky note 1012. In addition, a mathematical expression handled as a function can be used to, for example, draw a graph.

A numerical value or mathematical expression input to the calculation sticky note 101 has character or symbol information by itself. Accordingly, the numerical value or mathematical expression input to the calculation sticky note 101 can be used to input information to another calculation sticky note 101 by a copy and paste operation by the user.

In addition, in this embodiment, the contents displayed on the reference sticky note 103 (to be described later) can be used as input contents to the calculation sticky note 101. The contents displayed on the reference sticky note 103 may have only character information without any numerical information. A numerical value or mathematical expression having only character information is, for example, a numerical value or mathematical expression displayed on an electronic book. Electronic books may be those having textbook information, reference book information, paper collection information, and the like. In addition, electronic books may be obtained by digitizing paper books by scanning and the like. A numerical value or mathematical expression having only character information may be information of various types of electronic media other than electronic books.

The graph function sticky note 102 is a sticky note including a display area for displaying an input function upon reception of a user operation. When, for example, the user selects "graph sticky note creation" from the sticky note creation menu, the graph function sticky note 102 and the software keyboard are displayed in the paper 100. The user can input a desired function into the graph function sticky note 102 by selecting corresponding keys of the software keyboard. The function information input to the graph function sticky note 102 is sent to the server 10. The server 10 calculates the coordinates of a point group for displaying a graph based on the sent function information and returns the information of the calculated coordinates of the point group to the terminal 20. Upon reception of the input of the coordinates of the point group, the terminal 20 creates a graph sticky note (not shown) in the paper 100 and draws the graph on the graph sticky note.

The reference sticky note 103 is a sticky note including a display area for displaying the contents of another file such as an electronic book as a reference. For example, when the user selects "reference sticky note creation" from the sticky note creation menu and selects a file such an electronic book to be displayed, the reference sticky note 103 is displayed on the paper 100.

Figure 3:
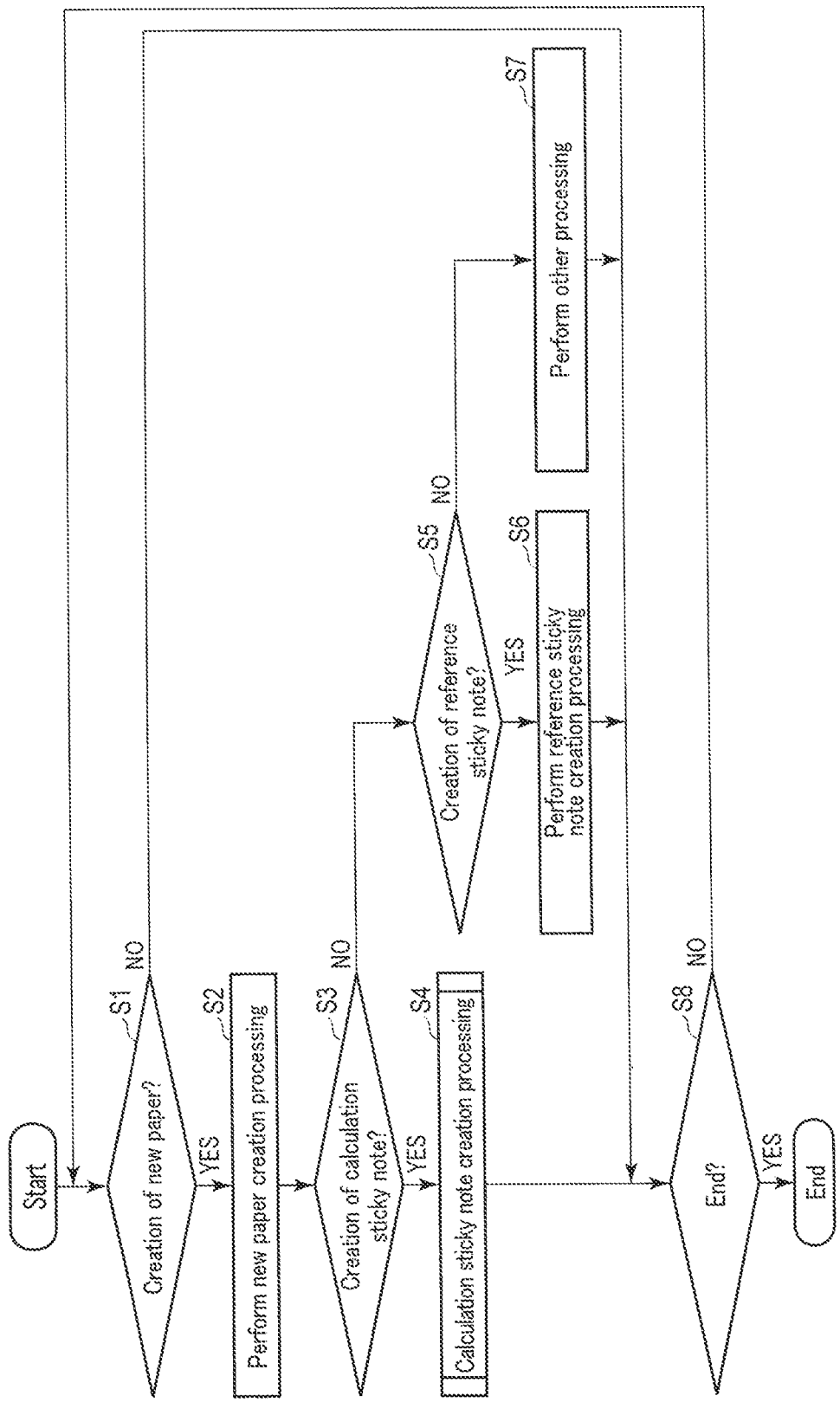
FIG. 3 is a flowchart showing an example of a processing procedure at the time of execution of a web application in a system.

A series of processing procedures in the system 1 will be described below. FIG. 3 shows an example of a processing procedure at the time of execution of a web application in the system 1. The processing shown in FIG. 3 is executed when the terminal 20 issues a request to start up a web application to the server 10. Note that when a request to start up a web application is issued, login processing such as the input of an ID and a password may be performed. Upon reception of a request to start up a web application, the server 10 sends a web application program including initial screen data to the terminal 20. Upon reception of this program, the terminal 20 displays an initial screen on the web browser. On the initial screen, the paper 100 is not created, and the new paper creation icon 100c is displayed on the upper area 100a. Note that the processing shown in FIG. 3 is executed by cooperation between the CPU 21 of the terminal 20 and the processor 11 of the server 10.

In step S1, the CPU 21 of the terminal 20 determines whether to create a new paper. For example, when the user selects the new paper creation icon 100c on the initial screen, the CPU 21 of the terminal 20 determines that a new paper is created. If the CPU 21 does not determine in step S1 that a new paper is created, the process shifts to step S8. If the CPU 21 determines in step S1 that a new paper is created, the process shifts to step S2.

In step S2, the CPU 21 newly creates the data of the paper 100. The CPU 21 displays and superimposes the created paper 100 on the display screen of the web application on the web browser. This updates the display on the web browser of the terminal 20 to a state in which the newly created paper 100 is displayed. The process then shifts to step S3.

In step S3, the CPU 21 determines whether to create the calculation sticky note 101. When, for example, the user has performed an operation for creating the calculation sticky note 101 upon creation of the paper 100, the CPU 21 determines that the calculation sticky note 101 is created. An operation for creating the calculation sticky note 101 is, for example, selecting "calculation sticky note creation" from the sticky note creation menu displayed when the user has selected an arbitrary position on the paper 100. Alternatively, the operation for creating the calculation sticky note 101 is the operation of selecting contents displayed on the reference sticky note 103. If the CPU 21 determines in step S3 that the calculation sticky note 101 is created, the process shifts to step S4. If the CPU 21 determines in step S3 that the calculation sticky note 101 is not created, the process shifts to step S5.

In step S4, the CPU 21 performs calculation sticky note creation processing. After the calculation sticky note creation processing, the process shifts to step S8. The calculation sticky note creation processing will be described in detail later.

In step S5, the CPU 21 determines whether to create the reference sticky note 103. When, for example, the user has performed an operation for creating the reference sticky note 103 upon creation of the paper 100, the CPU 21 determines that the reference sticky note 103 is created. An operation for creating the reference sticky note 103 is, for example, selecting "reference sticky note creation" from the sticky note creation menu displayed when the user has selected an arbitrary position on the paper 100. If the CPU 21 determines in step S5 that the reference sticky note 103 is created, the process shifts to step S6. If the CPU 21 determines in step S5 that the reference sticky note 103 is not created, the process shifts to step S7.

In step S6, the CPU 21 performs reference sticky note creation processing. Subsequently, the process shifts to step S8. In the reference sticky note creation processing, the CPU 21 waits for the selection of a file such as an electronic book file by the user. The file such as the electronic book file is stored in, for example, the storage 24 of the terminal 20. Alternatively, the file such as the electronic book file may be stored in the storage 14 of the server 10 or stored in another storage on the network 30. Upon reception of the selection of the file such as the electronic book file, the CPU 21 causes the paper 100 to display the reference sticky note 103 and causes the reference sticky note 103 to display the contents of the file such as the electronic book file selected by the user.

In step S7, the CPU 21 performs another processing other than the calculation sticky note creation processing. Another processing includes input processing to the created calculation sticky note. Input processing to the created calculation sticky note is the same as that with respect to a calculation sticky note to be created (to be described later). Accordingly, a description of the processing will be omitted. Other processing may include graph sticky note creation processing and geometric figure sticky note creation processing. A detailed description of such other processing will be omitted. Upon completion of other processing, the process shifts to step S8.

In step S8, the CPU 21 determines whether to end the web application processing. If, for example, the user has performed an operation for closing the web browser, the CPU 21 determines that the processing is ended. If the CPU 21 does not determine in step S8 that the processing is ended, the process returns to step S1. Upon determining in step S8 that the web application is ended, the CPU 21 ends the processing in FIG. 3.

Figure 4:
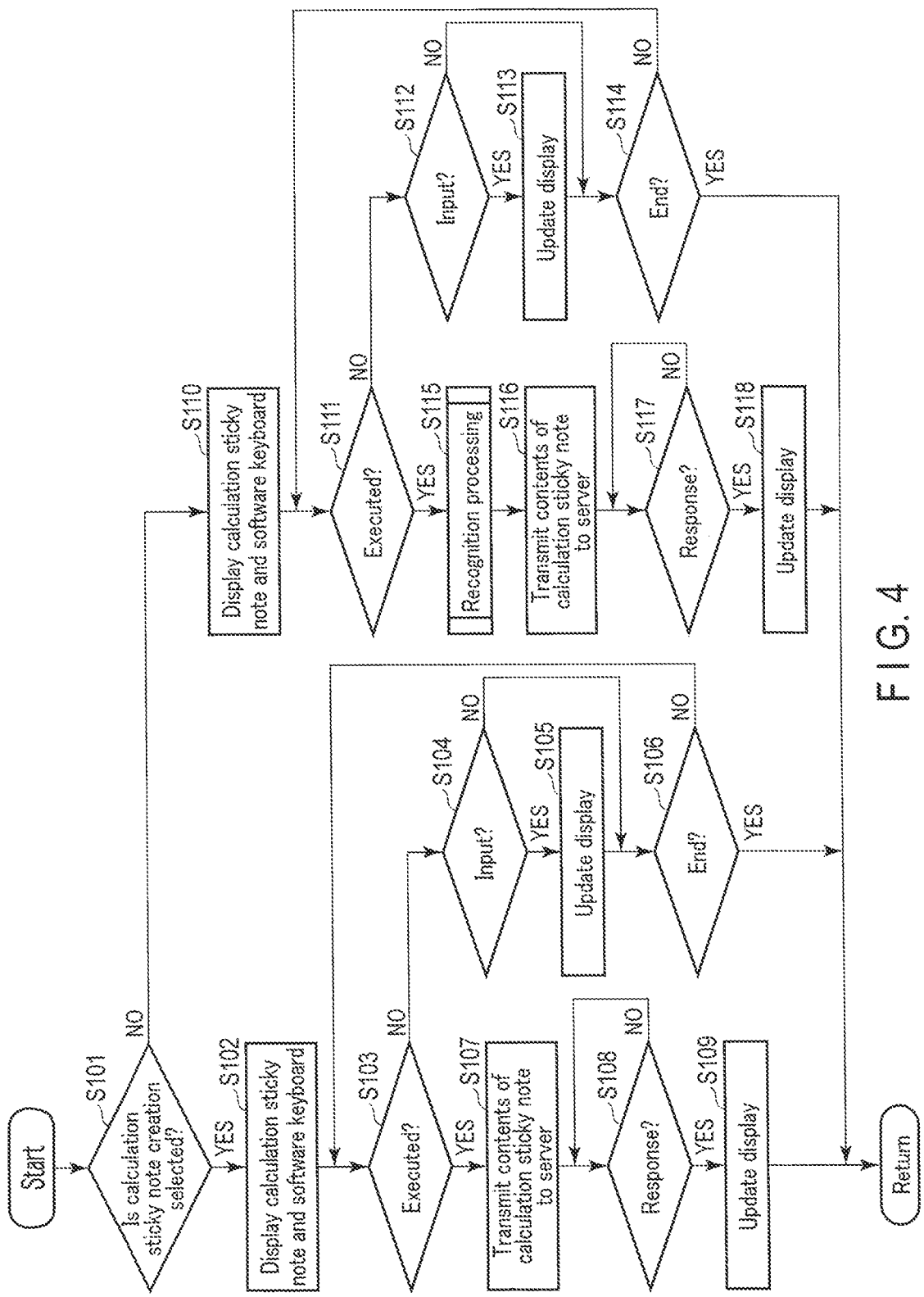
FIG. 4 is a flowchart showing an example of procedure of calculation sticky note creation processing.

FIG. 4 shows a procedure of an example of calculation sticky note creation processing. In step S101, the CPU 21 of the terminal 20 determines whether an operation for selecting "calculation sticky note creation" from the sticky note creation menu has been performed as an operation for creating the calculation sticky note 101. If the CPU 21 determines in step S101 that the operation of selecting "calculation sticky note creation" has been performed, the process shifts to step S102. If the CPU 21 determines in step S101 that the operation of selecting "calculation sticky note creation" has not been performed, that is, the contents displayed on the reference sticky note 103 have been selected, the process shifts to step S110.

In step S102, the CPU 21 displays the calculation sticky note 101 at the position on the paper 100 which is designated by the user. The CPU 21 also causes the paper 100 to display the software keyboard. The CPU 21 then starts input processing to the calculation sticky note 101.

In step S103, the CPU 21 determines whether an execution instruction is input. The execution instruction is issued by, for example, selecting the execution key of the software keyboard. If the CPU 21 determines in step S103 that an execution instruction is not input, the process shifts to step S104. If the CPU 21 determines in step S103 that an execution instruction is input, the process shifts to step S107.

The CPU 21 determines in step S104 whether there is an input by the user. The input by the user in step S104 is the input of a numerical value, mathematical expression, character, or mathematical symbol which the user wants to input to the calculation sticky note 101. The input by the user is performed with, for example, the software keyboard. The input by the user may be performed with a keyboard as hardware or the like. If the CPU 21 determines in step S104 that there is an input by the user, the process shifts to step S105. If the CPU 21 determines in step S104 that there is no input by the user, the process shifts to step S106.

In step S105, the CPU 21 updates the display contents of the calculation sticky note 101 in accordance with the contents input by the user. For example, the CPU 21 causes the calculation sticky note 101 to display the numerical value, mathematical expression, or character input by the user. Subsequently, the process shifts to step S106.

In step S106, the CPU 21 determines whether to end the input processing to the calculation sticky note 101. When, for example, the user selects a portion other than the calculation sticky note 101, the CPU 21 determines that the input processing to the calculation sticky note 101 is ended. Upon determining in step S106 that the input processing to the calculation sticky note 101 is ended, the CPU 21 ends the processing in FIG. 4. In this case, the process shifts to step S8 in FIG. 3. If the CPU 21 determines in step S106 that the input processing to the calculation sticky note 101 is not ended, the process returns to step S103.

In step S107, the CPU 21 transmits the contents input on the calculation sticky note 101 to the server 10. The processor 11 of the server 10 performs calculation in accordance with the received contents. As described above, if the mathematical expression input to the calculation sticky note 101 is an expression that can be singly numerically calculated, the processor 11 returns the calculation result on the mathematical expression to the terminal 20. In contrast to this, if the mathematical expression input to the calculation sticky note 101 is an expression that cannot be singly calculated, such as a literal expression or function and no necessary argument value is determined, the processor 11 returns, to the terminal 20, information indicating that the expression cannot be calculated.

In step S108, the CPU 21 determines whether there is a response from the server 10. The response in this case includes a calculation result or a notification indicating that calculation cannot be performed. The CPU 21 stands by until determining in step S108 that there is a response from the server 10. If the CPU 21 determines in step S108 that there is a response from the server 10, the process shifts to step S109.

In step S109, the CPU 21 updates the display contents of the calculation sticky note 101 in accordance with the response from the server 10. For example, the CPU 21 causes the calculation sticky note 101 to display the calculation result. Subsequently, the CPU 21 ends the processing in FIG. 4. In this case, the process shifts to step S8 in FIG. 3.

In step S110, the CPU 21 displays the calculation sticky note 101 at a predetermined position on the paper 100. In addition, the CPU 21 causes the paper 100 to display the software keyboard. The CPU 21 then starts input processing to the calculation sticky note 101.

In step S111, the CPU 21 determines whether an execution instruction is input. If the CPU 21 determines in step S111 that an execution instruction is not input, the process shifts to step S112. If the CPU 21 determines in step S111 that an execution instruction is input, the process shifts to step S115.

In step S112, the CPU 21 determines whether there is an input by the user. The input by the user in step S112 is, for example, the input of a variable name which the user wants to register in the form of variables. If the CPU 21 determines in step S112 that there is an input by the user, the process shifts to step S113. If the CPU 21 determines in step S112 that there is no input by the user, the process shifts to step S114.

In step S113, the CPU 21 updates the display contents of the calculation sticky note 101 in accordance with the contents input by the user. For example, the CPU 21 causes the calculation sticky note 101 to display the numerical value or character input by the user.

In step S114, the CPU 21 determines whether to end the input processing to the calculation sticky note 101. For example, if the user selects a portion other than the calculation sticky note 101 and the reference sticky note 103, the CPU 21 determines that the input processing to the calculation sticky note 101 is ended. Upon determining in step S114 that the input processing to the calculation sticky note 101 is ended, the CPU 21 ends the processing in FIG. 4. In this case, the process shifts to step S8 in FIG. 3. If the CPU 21 determines in step S114 that the input processing is ended, the CPU 21 may cancel the selection on the reference sticky note 103. If the CPU 21 determines in step S114 that the input processing to the calculation sticky note 101 is not ended, the process returns to step S111.

In step S115, the CPU 21 performs recognition processing of recognizing the contents selected on the reference sticky note 103. After the recognition processing, the process shifts to step S116. The recognition processing will be described in detail later.

In step S116, the CPU 21 transmits the contents input on the calculation sticky note 101 to the server 10. The processor 11 of the server 10 performs calculation in accordance with the received contents. As described above, if the mathematical expression input to the calculation sticky note 101 is an expression that can be singly numerically calculated, the processor 11 returns the calculation result on the mathematical expression to the terminal 20. In contrast to this, if the mathematical expression input to the calculation sticky note 101 is an expression that cannot be singly calculated, such as a literal expression or function and no necessary argument value is determined, the processor 11 returns, to the terminal 20, information indicating that the expression cannot be calculated.

In step S117, the CPU 21 determines whether there is a response from the server 10. The CPU 21 stands by until determining in step S117 that there is a response from the server 10. If the CPU 21 determines in step S117 that there is a response from the server 10, the process shifts to step S118.

In step S118, the CPU 21 updates the display contents of the calculation sticky note 101 in accordance with the response from the server 10. For example, the CPU 21 causes the calculation sticky note 101 to display the calculation result. Subsequently, the CPU 21 ends the processing in FIG. 4. In this case, the process shifts to step S8 in FIG. 3.

Figure 5:
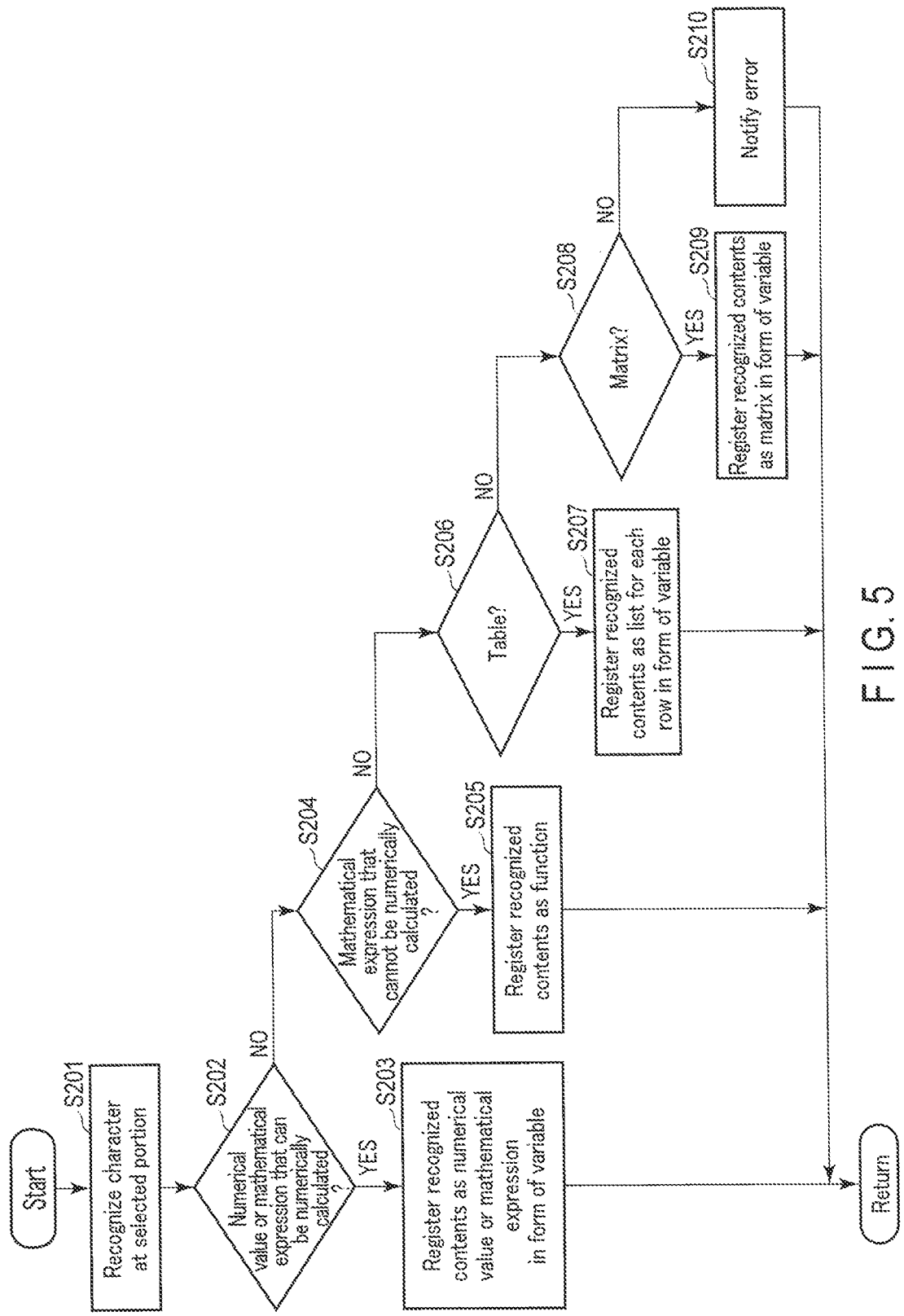
FIG. 5 is a flowchart showing recognition processing.

FIG. 5 is a flowchart showing recognition processing. In step S201, the CPU 21 recognizes the contents at the portion selected on the reference sticky note 103. After the recognition, the process shifts to step S202. For example, the storage 24 stores data in the shapes of numerical values, mathematical expressions (mathematical symbols), and character shapes. If the file used for the display of the reference sticky note 103 is a file whose contents cannot be directly recognized, such as an image file, the CPU 21 recognizes the file by comparing the displayed image with a shape of a numerical value, mathematical expression, or character. In contrast to this, if the file used for the display of the reference sticky note 103 is a file whose contents can be directly recognized, such as a text file, the CPU 21 recognizes the contents of the data.

In step S202, the CPU 21 determines whether the recognized contents correspond to a numerical value or mathematical expression that can be calculated. If the CPU 21 determines in step S202 that the recognized contents correspond to a numerical value or mathematical expression that can be calculated, the process shifts to step S203. If the CPU 21 determines in step S202 that the recognized contents do not correspond to a numerical value or mathematical expression that can be calculated, the process shifts to step S204.

In step S203, the CPU 21 registers, in the form of variables, the recognized contents as a numerical value or mathematical expression that can be calculated. That is, the CPU 21 links the recognized numerical value or mathematical expression to a variable name input by the user. Thereafter, the CPU 21 ends the processing in FIG. 5. In this case, the process shifts to step S116 in FIG. 4. Subsequently, the CPU 21 receives a calculation result from the server 10.

In step S204, the CPU 21 determines whether the recognized contents correspond to a mathematical expression that cannot be calculated. If the CPU 21 determines in step S204 that the recognized contents correspond to a mathematical expression that cannot be calculated, the process shifts to step S205. If the CPU 21 determines in step S204 that the recognized contents do not correspond to a mathematical expression that cannot be calculated, the process shifts to step S206.

In step S205, the CPU 21 registers, in the form of variables, the recognized contents as a mathematical expression that cannot be calculated, such as a function. That is, the CPU 21 links the recognized mathematical expression to the variable name input by the user. Subsequently, the CPU 21 ends the processing in FIG. 5. In this case, the process shifts to step S116 in FIG. 4, and the CPU 21 then receives, from the server 10, a notification indicating that the mathematical expression cannot be calculated. As described above, a mathematical expression that cannot be calculated is handled as a function.

In step S206, the CPU 21 determines whether the recognized contents correspond to a table. The table is, for example, an image having a numerical value or mathematical expression recorded in at least one cell or data representing the image. One cell is a region surrounded by four ruled lines. The table may be data such as spread sheet data. If the CPU 21 determines in step S206 that the recognized contents correspond to a table, the process shifts to step S207. If the CPU 21 determines in step S206 that the recognized contents do not correspond to a table, the process shifts to step S208.

In step S207, the CPU 21 registers, in the form of variables, the recognized contents as a list for each row. That is, the CPU 21 links a numerical value recognized for each row to a variable name input by the user in a list form. Subsequently, the CPU 21 ends the processing in FIG. 5. In this case, the process shifts to step S116 in FIG. 4.

In step S208, the CPU 21 determines whether the recognized contents correspond to a matrix. The matrix is an image having a plurality of numerical values or mathematical expressions arranged vertically and horizontally instead of being delimited with commas or data representing the image. If the CPU 21 determines in step S208 that the recognized contents correspond to a matrix, the process shifts to step S209. If the CPU 21 determines in step S208 that the recognized contents do not correspond to a matrix, the process shifts to step S210.

In step S209, the CPU 21 registers, in the form of variables, the recognized contents as a matrix. That is, the CPU 21 links the recognized numerical value to the variable name input by the user in a matrix form. Subsequently, the CPU 21 ends the processing in FIG. 5. In this case, the process shifts to step S116 in FIG. 4.

In step S210, the CPU 21 notifies an error. That is, if the recognized contents do not correspond to any of a numerical value, a mathematical expression, a table, and a matrix, the CPU 21 notifies an error.

Figure 6:
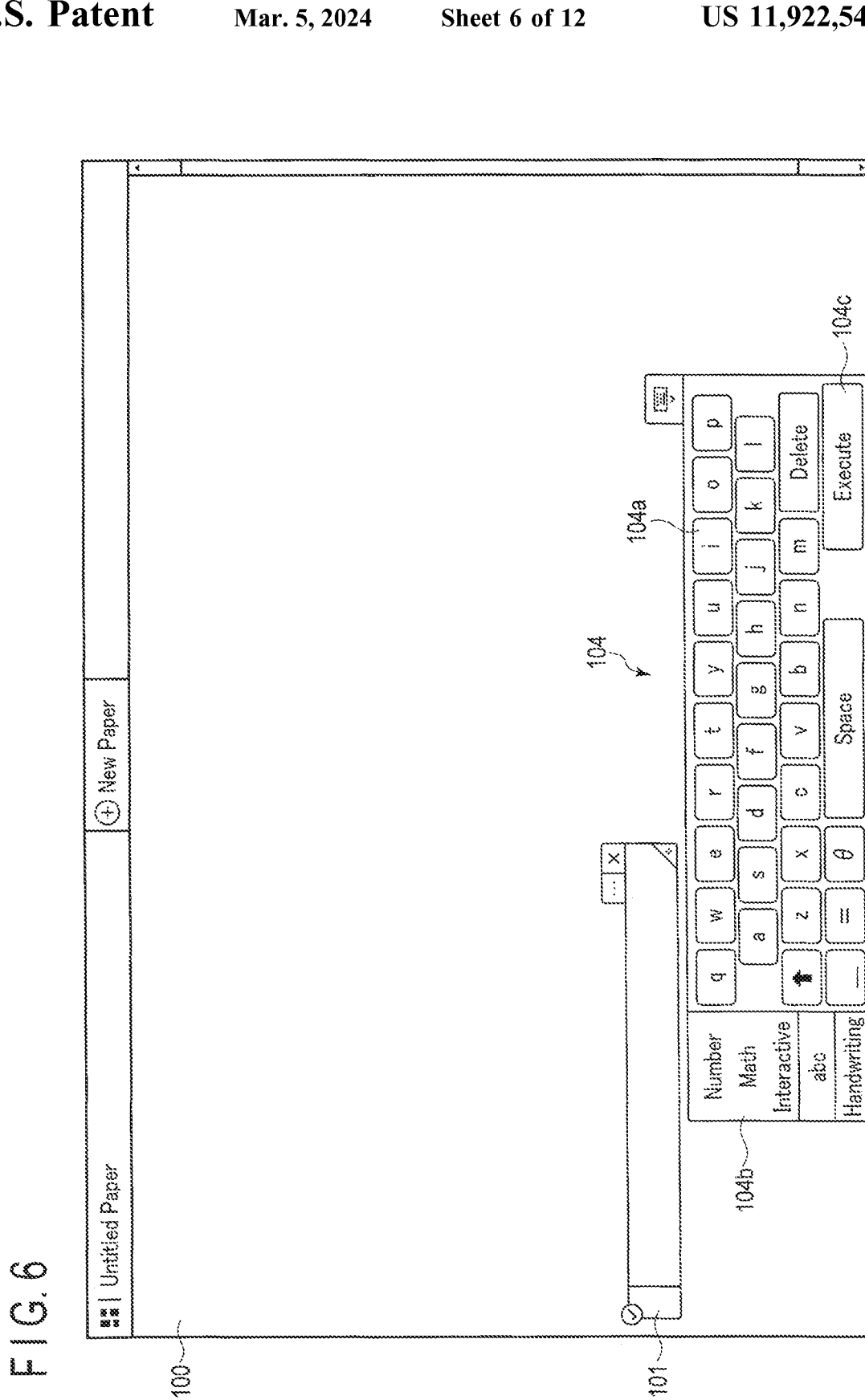
FIG. 6 is a view for explaining a normal calculation sticky note creating operation.

The processing in FIG. 5 will be described in detail below. FIG. 6 is a view for explaining a normal calculation sticky note creating operation. That is, FIG. 6 shows an operation to be performed when "calculation sticky note creation" is selected from the sticky note creation menu as an operation for creating the calculation sticky note 101. At this time, the calculation sticky note 101 and a software keyboard 104 are displayed on the paper 100. The software keyboard 104 includes, for example, input keys 104*a*, a keyboard switching key 104*b*, and an execution key 104*c*. The input keys 104*a* are keys for inputting characters, numbers, and symbols. The keyboard switching key 104*b* is a key for switching the input keys 104*a* among keys corresponding to various types of keyboards such alphabet input keys, numerical value input keys, and mathematical symbol input keys. The execution key 104*c* is a key for execution of numerical calculation on the calculation sticky note 101.

The user inputs a desired character, number, or symbol to the calculation sticky note 101 by selecting a desired keyboard by the keyboard switching key 104*b* and appropriately selecting each of the input keys 104*a*. The user then selects the execution key 104*c* as needed. Upon reception of the selection of the execution key 104*c*, the CPU 21 transmits the contents of the calculation sticky note 101 to the server 10. In this case, as shown in FIG. 2, a calculation result is displayed at, for example, the lower right corner of the calculation sticky note 101.

That is, in a normal calculation sticky note creating operation, a numerical value or mathematical expression is input in accordance with the operation of the user.

Figure 7:
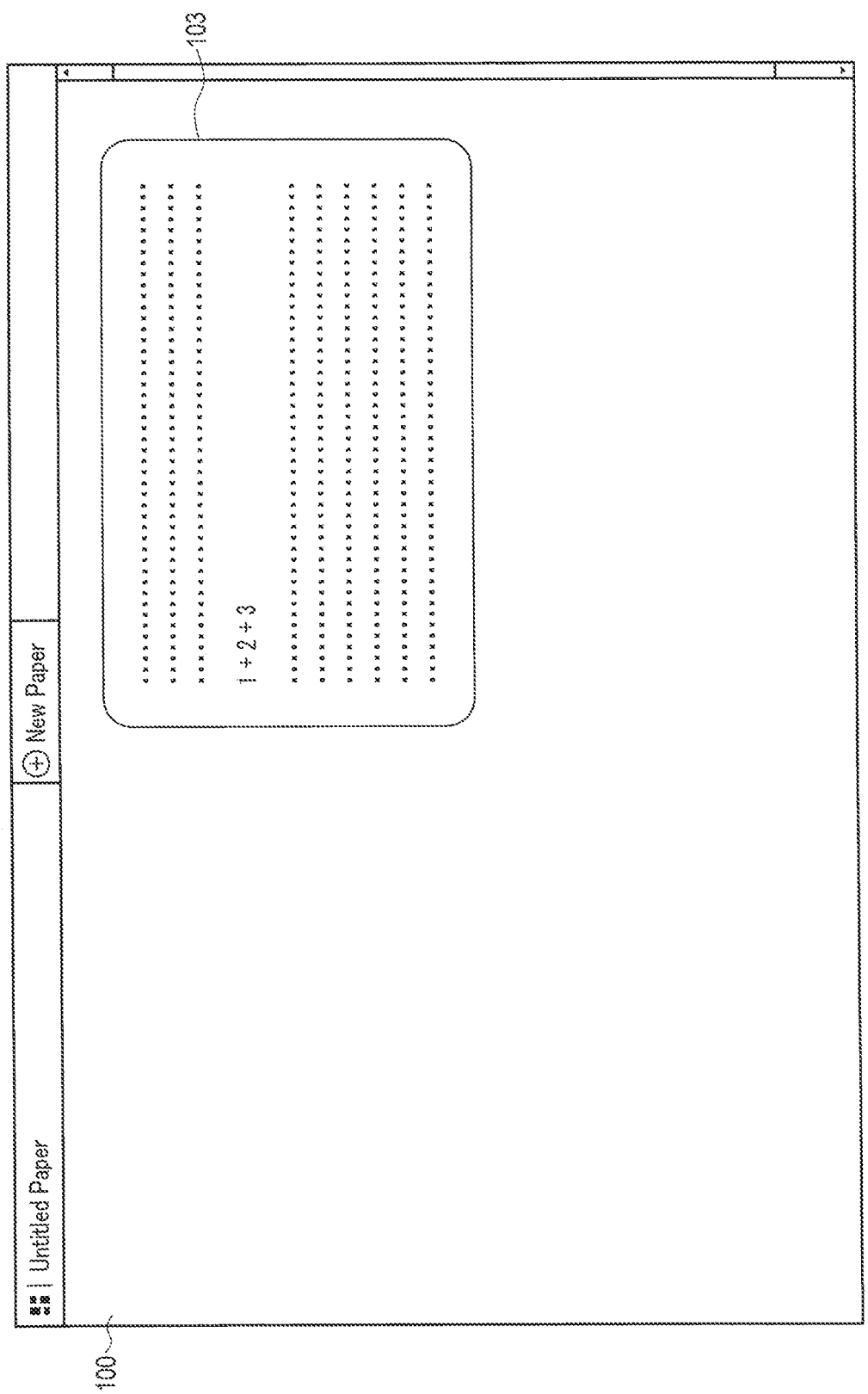
FIG. 7 is a view for explaining a first creating operation for a calculation sticky note from a reference sticky note.
Figure 8:
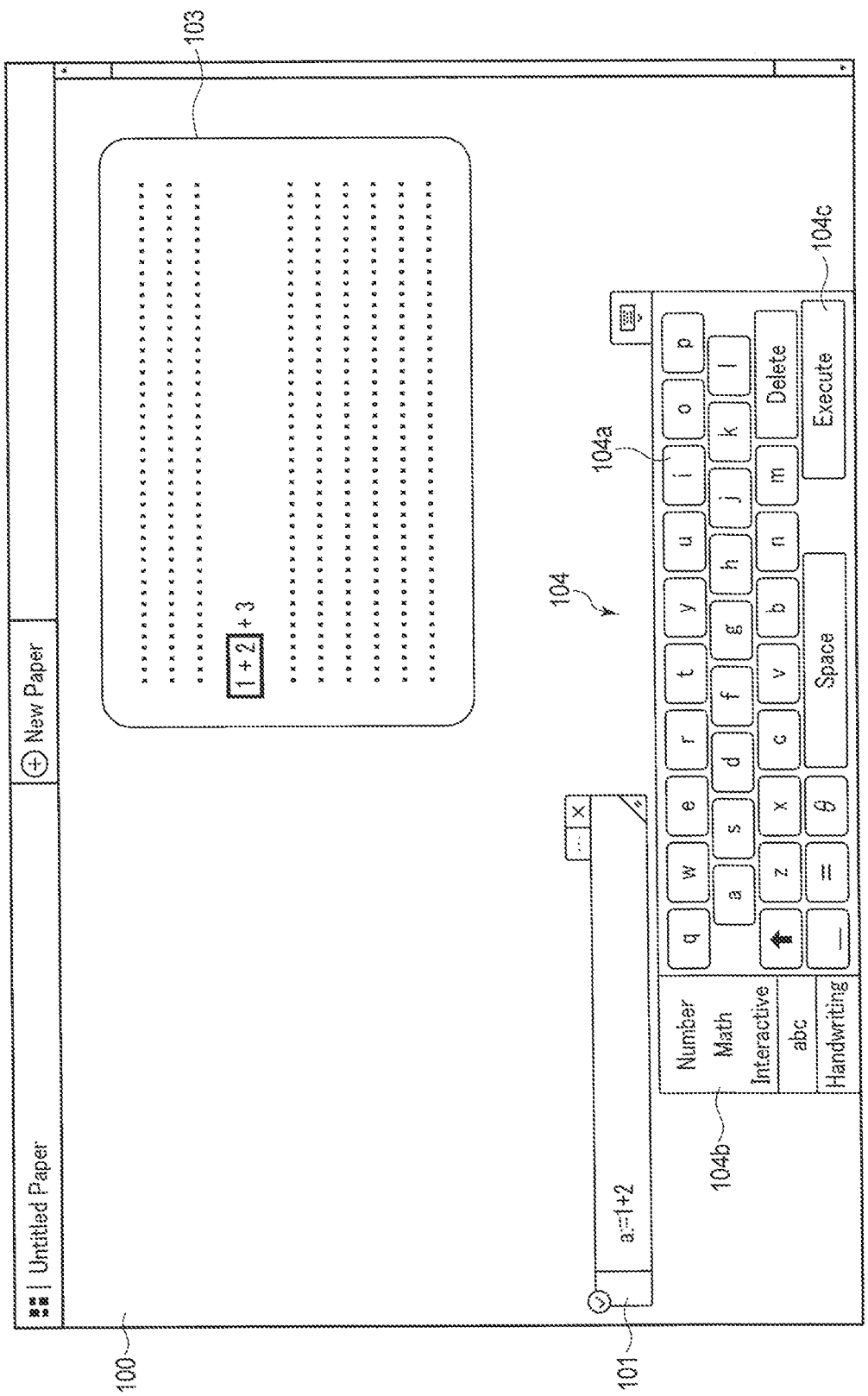
FIG. 8 is a view for explaining the first creating operation for a calculation sticky note from a reference sticky note.

FIGS. 7 and 8 are views for explaining a first creating operation for a calculation sticky note from a reference sticky note. FIG. 7 shows the contents of an electronic book in the reference sticky note 103. Assume that, for example, the mathematical expression "1+2+3" is described in this electronic book. The user selects a mathematical expression in the reference sticky note 103 by, for example, a dragging operation. Assume that the user has selected "1+2" in the reference sticky note 103. In this case, a cursor including selected portion "1+2" on the reference sticky note 103 is displayed on the display screen. At this time, the calculation sticky note 101 and the software keyboard 104 are displayed on the paper 100.

The user inputs a variable name by operating the input keys 104a of the software keyboard 104. After inputting the variable name, the user selects the execution key 104c. Since the selected portion corresponds to a mathematical expression, the mathematical expression selected on the reference sticky note 103 is linked to the variable name and registered in the form of variables. In this case, "1+2" is a mathematical expression that can be singly numerically calculated. Accordingly, "1+2" is registered as a mathematical expression that can be calculated in the form of variables. For example, FIG. 8 shows an example in which the user has input the variable name "a". At this time, "a=1+2" is displayed on the calculation sticky note 101. In addition, the user selects the execution key 104c as needed. Upon reception of the selection of the execution key 104c, the CPU 21 transmits the contents of the calculation sticky note 101 to the server 10. In this case, the calculation result is displayed at, for example, the lower right corner of the calculation sticky note 101 as shown in FIG. 2. That is, "3" as the calculation result of "1+2" is displayed on the calculation sticky note 101.

In the example shown in FIG. 8, after the contents of the reference sticky note 103 are selected, the calculation sticky note 101 and the software keyboard 104 are displayed. In contrast to this, when the contents of the reference sticky note 103 are selected while the calculation sticky note 101 and the software keyboard 104 are displayed as in the case with a normal calculation sticky note creating operation, the contents of the reference sticky note 103 may be registered in the form of variables.

When the user selects the execution key 104c without inputting any variable name, the contents of the selected reference sticky note 103 may be displayed on the calculation sticky note 101. Alternatively, when the user selects the execution key 104c without inputting any variable name, the contents of the reference sticky note 103 may be linked to a predetermined variable name in the form of variables.

Figure 9:
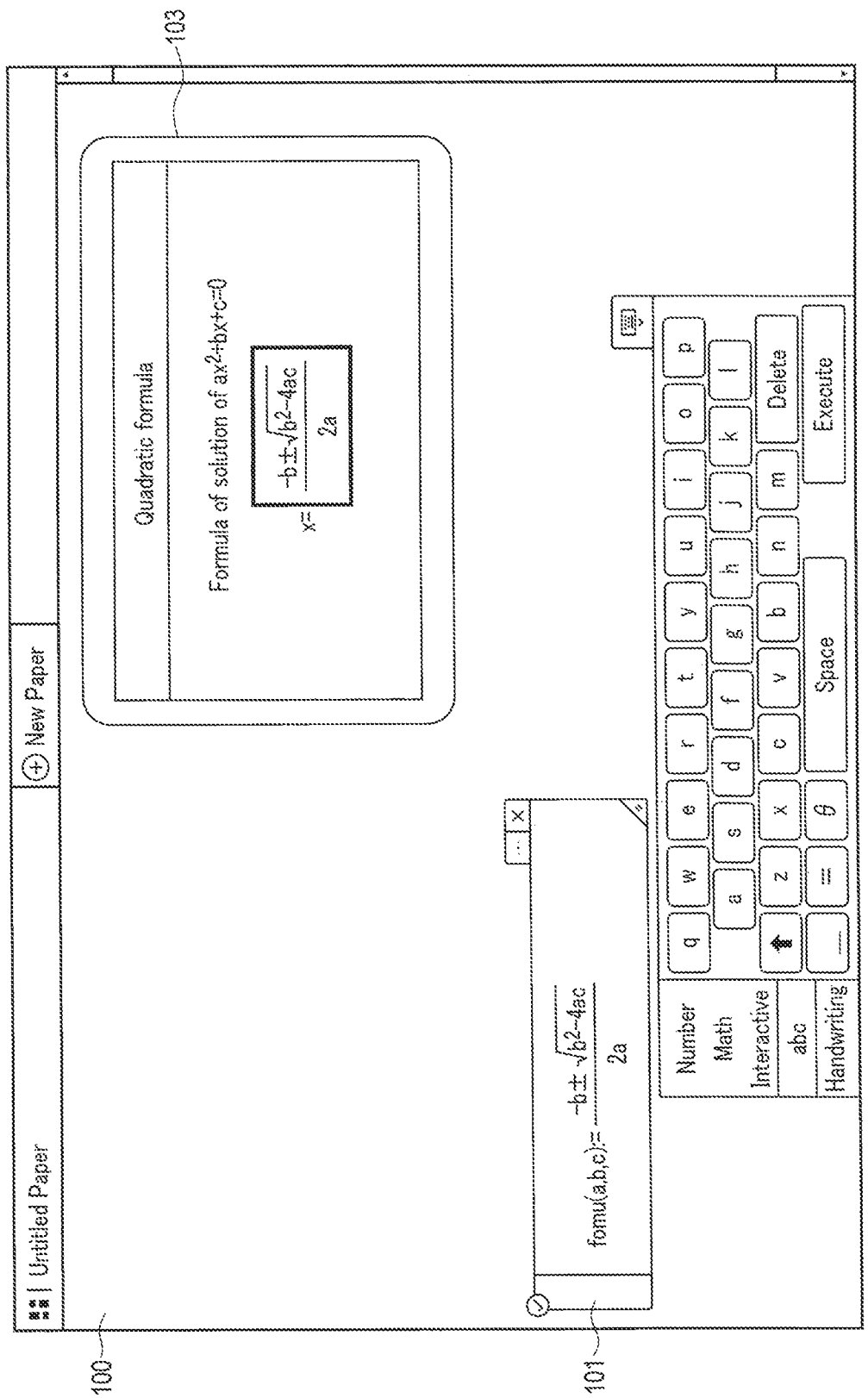
FIG. 9 is a view for explaining a second creating operation for a calculation sticky note from a reference sticky note.

FIG. 9 is a view for explaining a second creating operation for a calculation sticky note from a reference sticky note. FIG. 9 shows a textbook for explaining "quadratic formula" is displayed on the reference sticky note 103. The quadratic formula is a mathematical expression having three coefficients "a", "b", and "c". The user selects a mathematical expression in the reference sticky note 103 by, for example, a dragging operation. At this time, the calculation sticky note 101 and the software keyboard 104 are displayed on the paper 100.

The user inputs a variable name by operating the input keys 104a of the software keyboard 104. After inputting the variable name, the user selects the execution key 104c. Since the selected portion corresponds to a mathematical expression, the mathematical expression selected on the reference sticky note 103 is linked to the variable name and registered in the form of variables. In this case, the quadratic formula is a mathematical expression that has three coefficients and cannot be singly numerically calculated. Accordingly, the quadratic formula is registered as a function in the form of variables. For example, FIG. 9 shows an example in which the user has input the variable name "fomu". At this time, both "fomu (a, b, c)" and the selected mathematical expression are displayed on the calculation sticky note 101. Referring to FIG. 9, (a, b, c) following "fomu" indicates a subsequent mathematical expression is a function of a, b, and c. The manner of registering a quadratic formula as a function may be changed as needed in accordance with the specification of a web application and the like.

Figure 10:
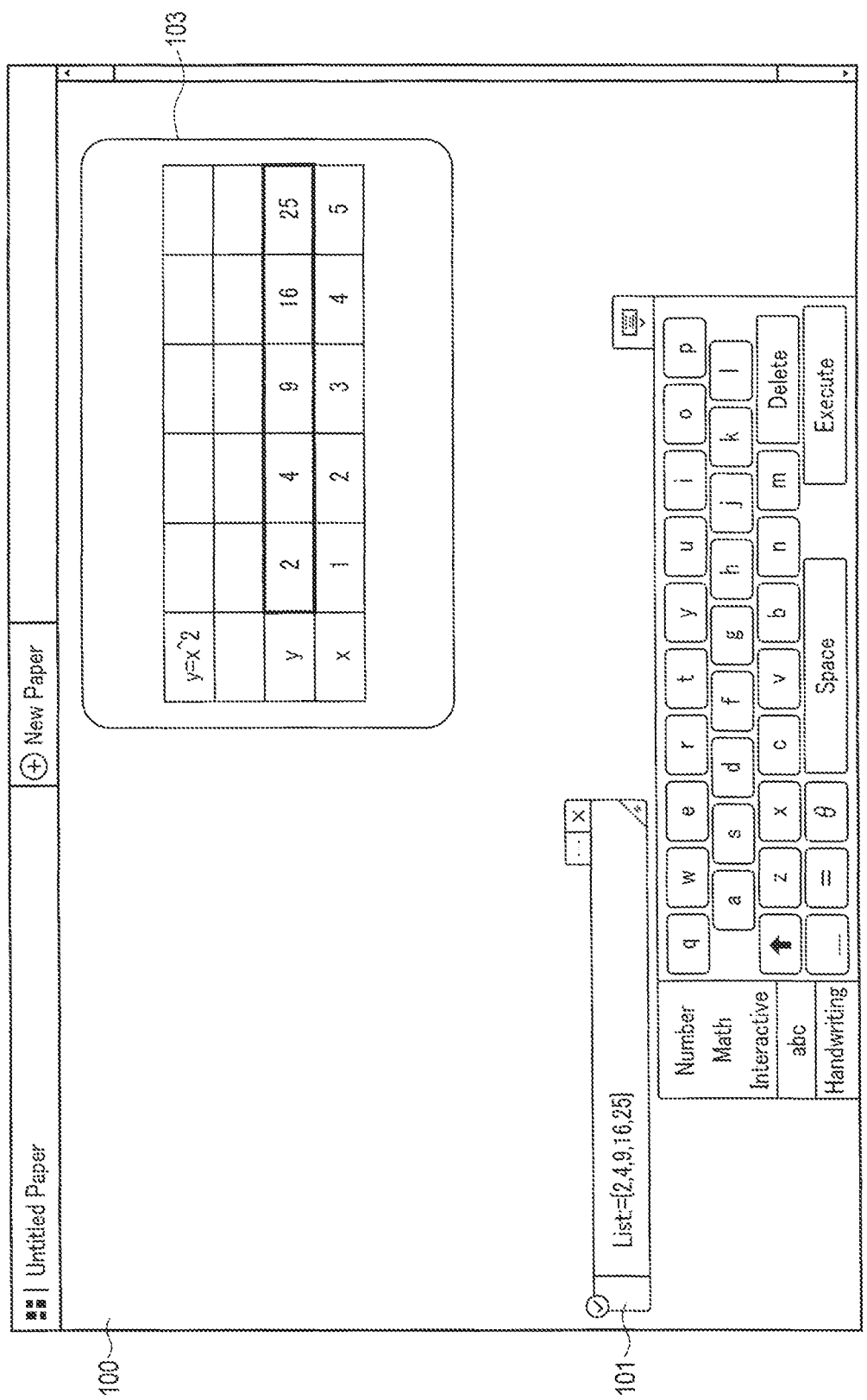
FIG. 10 is a view for explaining a third creating operation for a calculation sticky note from a reference sticky note.
Figure 11:
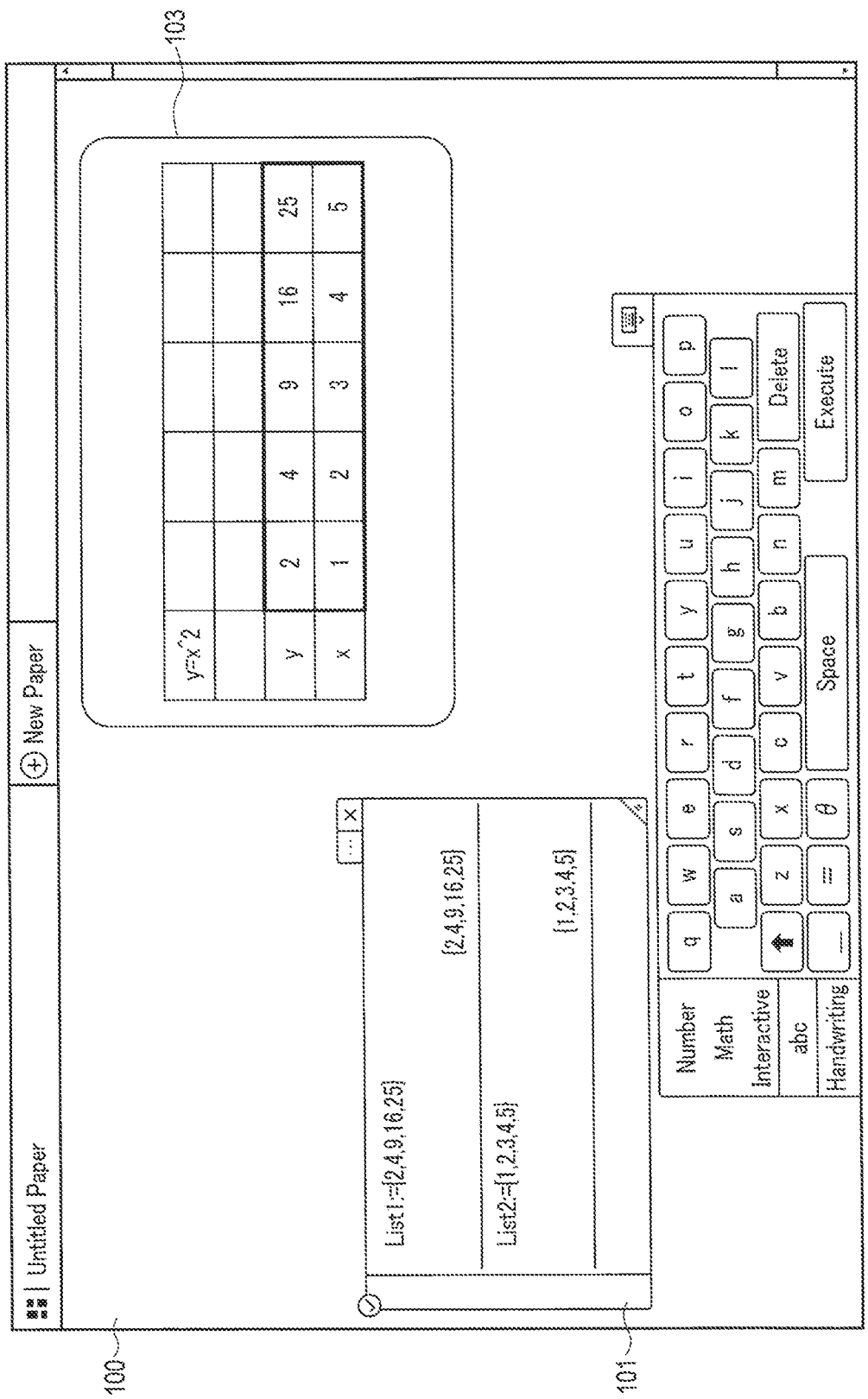
FIG. 11 is a view for explaining the third creating operation for a calculation sticky note from a reference sticky note.

FIGS. 10 and 11 are views for explaining a third creating operation for a calculation sticky note from a reference sticky note. Referring to FIGS. 10 and 11, a spread sheet representing the table calculation result of "y=x$^2$" is displayed on the reference sticky note 103. The user selects a table in the reference sticky note 103 by a dragging operation.

Assume that the user has selected the respective numerical values in the y row in the reference sticky note 103, as shown in FIG. 10. At this time, the calculation sticky note 101 and the software keyboard 104 are displayed on the paper 100.

The user inputs a variable name by operating the input keys 104a of the software keyboard 104. After inputting the variable name, the user selects the execution key 104c. Since the selected portion corresponds to a table, the corresponding information is registered as a list having the respective numerical values selected on the reference sticky note 103 as elements in the form of variables. For example, FIG. 10 shows an example in which the user has input the variable name "List". In this case, for example, "List={2, 4, 9, 16, 25}" is displayed on the calculation sticky note 101. The respective numerical values registered in the form of a list can be collectively used for calculation as in the case with a one-row matrix. When, for example, the calculation of multiplying "List" by 2 is input on the calculation sticky note 101, each numerical value in "List" is doubled. The manner of registering numerical values in the form of a list may be changed as needed in accordance with the specification of a web application and the like.

In this case, FIG. 10 shows an example in which one row is selected. For example, when the user selects the respective numerical values in two rows, that is, the y row and the x row, in the reference sticky note 103 as shown in FIG. 11, the corresponding information is registered as two lists having the numerical values in the respective rows as elements in the form of variables. For example, "List1={2, 4, 9, 16, 25}" and "List2={1, 2, 3, 4, 5}" are displayed on the calculation sticky note 101. The same applies to a case in which the respective values in three or more rows are selected. When a list of a plurality of rows is created, a number for identifying a list is attached to the end of a variable name.

FIG. 12 is a view for explaining a fourth creating operation for a calculation sticky note from a reference sticky note. Referring to FIG. 12, a textbook for explaining a matrix is displayed on the reference sticky note 103. The user selects a matrix in the reference sticky note 103 by, for example, a dragging operation. At this time, the calculation sticky note 101 and the software keyboard 104 are displayed on the paper 100.

Subsequently, the user inputs a variable name by operating the input keys 104a of the software keyboard 104. After inputting the variable name, the user selects the execution key 104c. Since the selected portion corresponds to the matrix, the matrix selected on the reference sticky note 103 is linked to the variable name and registered in the form of variables. For example, FIG. 12 shows an example in which the user has input the variable name "Mat". At this time, both "Mat" and the selected matrix are displayed on the calculation sticky note 101. In the example shown in FIG. 12, the matrix is displayed for each row delimited with a comma. The manner of registering information in the form of a matrix may be changed as needed in accordance with the specification of a web application and the like.

As has been described above, according to this embodiment, the contents displayed on the reference sticky note 103 of the paper 100 can be used as input contents to the calculation sticky note 101. This can reduce the time and effort in inputting, for example, a mathematical expression written on a textbook to the calculation sticky note 101. Accordingly, the technique according to this embodiment can be said to be an input scheme convenient for the user.

According to this embodiment, a numerical value, mathematical expression, table, or matrix to be input is automatically converted to be suitable for an input form to the calculation sticky note 101 in accordance with to which one of a numerical value, a mathematical expression, a table, and a matrix the portion selected on the reference sticky note 103 corresponds and in accordance with whether the mathematical expression, assuming that the selected portion corresponds to the mathematical expression, is a mathematical expression that can be calculated. That is, the user can use an input numerical value, mathematical expression, table, or matrix by only selecting a necessary portion of the reference sticky note 103. This can also reduce the time and effort in inputting by the user.

The above embodiment has exemplified the numerical values, mathematical expressions, tables, and matrices display on the reference sticky note 103 as input targets to the calculation sticky note 101. However, other contents may be input targets. In addition, the contents of the reference sticky note 103 may be used as various types of inputs supported by a web application.

In addition, the above embodiment has exemplified the case in which the selected portions in the electronic book displayed on the reference sticky note 103 are input targets to the calculation sticky note 101. In contrast to this, the contents of an electronic book or the like displayed in a region of the display 26 other than the reference sticky note 103 may be input targets to the calculation sticky note 101. For example, the contents of an electronic book displayed on an electronic book application started independently of the web browser may also be input targets to the calculation sticky note 101.

According to the above embodiment, the terminal 20 is configured to execute calculation processing and the like by downloading programs for web applications from the server 10. In contrast to this, storing programs equivalent to web applications in the storage 24 of the terminal 20 allows the terminal 20 to independently execute the web application processing described in the above embodiment. In this case, the terminal 20 need not have a communication function. In contrast to this, the server 10 may perform the recognition processing and the like described above. According to one embodiment, various types of programs described above may be recorded on a computer-readable recording medium as a non-transitory medium and provided for the terminal 20 or the server 10 via the recording medium. As computer-readable recording media, it is possible to use a mask ROM and/or a nonvolatile memory such as a flash memory, other types of nonvolatile memories such as an MRAM, and portable recording media such as an HDD, a CD-ROM, and a DVD. However, the recording media to be used are not limited to them.

The present invention is not limited to the above embodiment, and various modifications of the embodiment can be made in the execution stage within the spirit and scope of the invention. The respective embodiments can be properly combined and executed as much as possible. In this case, combining them will produce effects. In addition, the above embodiments include inventions at various stages, and various inventions can be extracted by appropriately combining a plurality of disclosed constituent elements. Assume that some constituent requirements are omitted from all the constituent requirements described in the embodiments. In this case, if the problem described in the column of the problem to be solved by the invention can be solved and the effects described in the column of the effects of the invention can be obtained, the configuration in which this constituent requirement is omitted can be extracted as an invention.

The invention claimed is:

1. A non-transitory computer-readable recording medium recording an input program for causing a computer to at least execute:
   selecting, based on an input by a user, a recognition target from contents of an electronic book displayed on a reference sticky note on a display;
   starting displaying a calculation sticky note on the display if one of a numerical value, a mathematical expression, a table and a matrix is selected as the recognition target; and
   upon receiving an input of a variable name to the calculation sticky note by the user with the recognition target being selected, displaying, on the calculation sticky note, information obtained by copying the recognition target or information generated to correspond to the recognition target so as to be linked to the variable name.

2. The non-transitory computer-readable recording medium according to claim 1,
   wherein the input program causes the computer to execute:
   if the numerical value or the mathematical expression is selected as the recognition target, displaying, on the calculation sticky note, the information obtained by copying the recognition target so as to be linked to the variable name; and
   if the table or the matrix is selected as the recognition target, displaying, on the calculation sticky note, the information generated to correspond to the recognition target so as to be linked to the variable name.

3. The non-transitory computer-readable recording medium according to claim 2,
   wherein the input program causes the computer to execute:
   if the mathematical expression is selected as the recognition target, determining whether the mathematical expression is a mathematical expression that can be calculated; and
   in response to determining that the mathematical expression is a mathematical expression that can be calculated, further displaying, on the calculation sticky note, a result of calculating of the mathematical expression.

4. The non-transitory computer-readable recording medium according to claim 2,
   wherein the input program causes the computer to execute:
   if the mathematical expression is selected as the recognition target, determining whether the mathematical expression is a mathematical expression that can be calculated; and in response to determining that the mathematical expression is a mathematical expression that cannot be calculated, displaying, on the calculation sticky note, the information obtained by copying the recognition target as a function.

5. The non-transitory computer-readable recording medium according to claim 2,
wherein, if the table is selected as the recognition target, the information generated to correspond to the recognition target is generated as information containing elements in each row of the table as a list.

6. The non-transitory computer-readable recording medium according to claim 2,
wherein, if the matrix is selected as the recognition target, the information generated to correspond to the recognition target is generated as information containing elements in each row of the matrix as a list.

7. The non-transitory computer-readable recording medium according to claim 1,
wherein the input program causes the computer to execute:
if the information obtained by copying the recognition target or the information generated to correspond to the recognition target is displayed on the calculation sticky note so as to be linked to the variable name, displaying the variable name on a left-hand side and displaying the information obtained by copying the recognition target or the information generated to correspond to the recognition target on a right-hand side.

8. An input device comprising:
an input interface configured to select, based on an input by a user, a recognition target from contents of an electronic book displayed on a reference sticky note on a display; and
a processor configured to:
start displaying a calculation sticky note on the display if one of a numerical value, a mathematical expression, a table and a matrix is selected as the recognition target; and
upon receipt of an input of a variable name to the calculation sticky note by the user with the recognition target being selected, display, on the calculation sticky note, information obtained by copying the recognition target or information generated to correspond to the recognition target so as to be linked to the variable name.

9. The input device according to claim 8,
wherein, if the numerical value or the mathematical expression is selected as the recognition target, the processor is configured to display, on the calculation sticky note, the information obtained by copying the recognition target so as to be linked to the variable name, and wherein, if the table or the matrix is selected as the recognition target, the processor is configured to display, on the calculation sticky note, the information generated to correspond to the recognition target so as to be linked to the variable name.

10. The input device according to claim 8,
wherein the processor is configured to:
if the mathematical expression is selected as the recognition target, determine whether the mathematical expression is a mathematical expression that can be calculated; and
in response to determining that the mathematical expression is a mathematical expression that can be calculated, further display, on the calculation sticky note, a result of calculating of the mathematical expression.

11. The input device according to claim 8,
wherein the processor is configured to:
if the mathematical expression is selected as the recognition target, determine whether the mathematical expression is a mathematical expression that can be calculated; and
in response to determining that the mathematical expression is a mathematical expression that cannot be calculated, display, on the calculation sticky note, the information obtained by copying the recognition target as a function.

12. The input device according to claim 8,
wherein, if the table is selected as the recognition target, the information generated to correspond to the recognition target is generated as information containing elements in each row of the table as a list.

13. The input device according to claim 8,
wherein, if the matrix is selected as the recognition target, the information generated to correspond to the recognition target is generated as information containing elements in each row of the matrix as a list.

14. An input method comprising:
selecting, based on an input by a user, a recognition target from contents of an electronic book displayed on a reference sticky note on a display;
starting displaying a calculation sticky note on the display if one of a numerical value, a mathematical expression, a table and a matrix is selected as the recognition target; and
upon receiving an input of a variable name to the calculation sticky note by the user with the recognition target being selected, displaying, on the calculation sticky note, information obtained by copying the recognition target so as to be linked to the variable name.

\* \* \* \* \*